United States Patent Office 2,713,781
Patented July 26, 1955

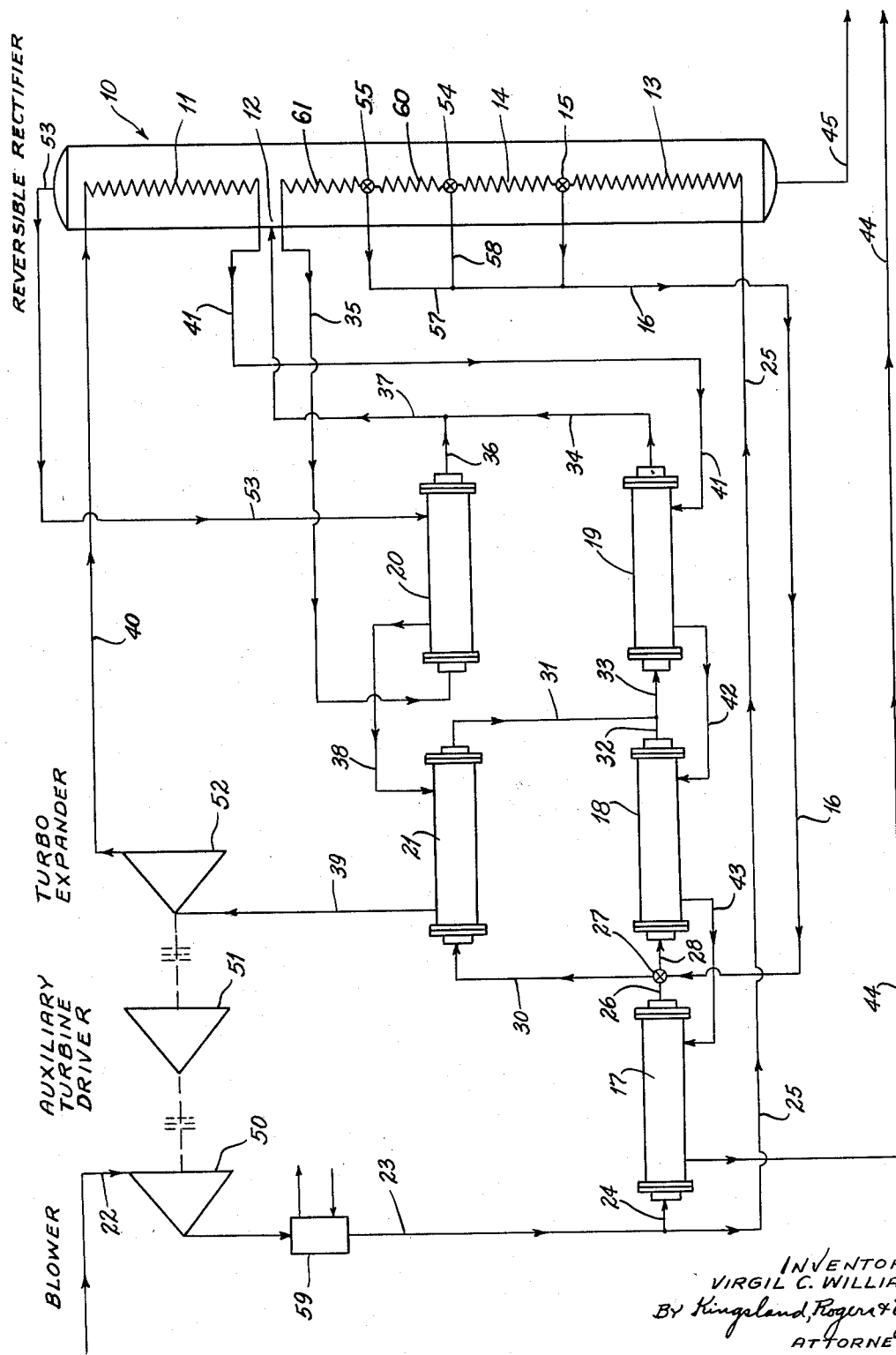

2,713,781

VARIABLE REVERSIBLE RECTIFICATION PROCESS

Virgil C. Williams, Kirkwood, Mo., assignor to Mississippi River Fuel Corporation, St. Louis, Mo., a corporation of Delaware Application October 26, 1953, Serial No. 388,145

10 Claims. (Cl. 62—175.5)

This invention relates to improvements in process and apparatus for rectifying gaseous mixtures having different boiling points for the individual components and, in particular, is concerned with process and apparatus for separating a low boiling constituent from higher boiling constituents in a reversible rectification process.

This invention is a continuation-in-part of my application for "Process and Apparatus for Separation of Gases," Serial No. 303,276, filed August 8, 1952, wherein process and apparatus for the separation of gases by a reversible rectification process is disclosed. The present invention comprises improvements in process and apparatus for reversibly rectifying a low boiling constituent from higher boiling constituents in a gaseous mixture by the use of less complicated equipment, and by a system wherein the heating fluid supplied to the rectification column can be varied both as to the total amount of flow charged therein, and the amount of heating fluid which flows entirely therethrough, such that part may be divided out.

By means of this invention, a portion of the raw feed itself can be used as a heating means within the rectification column. In order to provide for the most efficient utilization of heat, part of this feed introduced into the rectification column can be divided from the main stream within this column and removed therefrom. Thus, where the raw feed in the column has been cooled to the dew-point, most of the cooling effect of the downcoming liquid feed within the column which is to be rectified would ordinarily be utilized in latent heat of condensation in so cooling the portion of the feed used for heating purposes. To prevent this and to obtain as low a temperature as is possible, a portion is divided and recycled to the system for further cooling prior to its introduction in the column with the remainder of the feed gas. The portion of the feed that is used in the rectification column for heating purposes that has not been divided is caused to be led upwardly within the column in heat exchange relationship with the descending feed fluid which is to be rectified, and is removed adjacent to the inlet of the feed to the column after being in heat exchange relationship with the descending feed fluid throughout. The heating fluid which is so caused to be moved upwardly in this heat exchange relationship after being removed from the column is then further cooled to a low temperature where it can be introduced with the remainder of the initial feed to the column for rectification.

The only other source of refrigeration required in this process is supplied by the rectified gas having the lowest boiling point in the gaseous mixture which imparts a cooling effect derived from its own low temperature leaving the rectification column. A further cooling effect is established by an isentropic expansion within a turbo expander which does additional work in an initial compression stage on the feed gaseous mixture introduced into this system.

This process is adaptable for being used with gaseous mixtures having various compositions where the constituents have varying boiling points without the necessity of adding or abstracting heat from any outside means. This process is also particularly well suited for the separation of methane from natural gas mixtures and will be so described in connection therewith, but it is to be understood that by means of this invention other gaseous mixtures can be rectified according to the teachings herein with a small equipment outlay in a process which is well adapted for modification and extension to other feed and end product requirements.

It is, accordingly, an object of this invention to provide process and apparatus for reversibly rectifying a gaseous mixture wherein the separation is effected by a reversible rectification, and the heat source therefor is supplied by the feed gas itself, and wherein part of this feed gas used for heating purposes may be taken from the column prior to fulfilling the entire heating requirement.

It is a further object of this invention to provide process and apparatus for reversibly rectifying a gaseous mixture wherein the heating requirements within the rectification column are supplied by a portion of the feed mixture itself, and in which a portion of this feed used for heating is divided from the remainder thereof when the heating stream has been cooled in the rectification column in this process to its dew-point, and wherein the remainder of this stream is then passed in heat exchange relationship to the fluids within the column to a point adjacent the entry of the feed inlet and is then recycled to the main feed for ultimate rectification.

It is yet another object of this invention to provide process and apparatus for reversibly rectifying a gaseous mixture wherein all the heating and cooling requirements are substantially effected by the feed and product streams both within the rectification column and on the feed gas itself prior to introduction in the column.

A further object of this invention is to provide process and apparatus in a rectification column for supplying a heating fluid to the column beneath the feed entry to adjacent the feed entry and providing a heat exchange surface therefor which also functions as the mass transfer means within the column. Also, means are provided for separating a portion of the heating fluid prior to passing through the entire heat exchange means together with means for varying this point of separation between the top and bottom of the heat exchange means.

It is yet another object of this invention to provide process and apparatus for reversibly rectifying a gaseous mixture wherein the heating requirements within the column are supplied by a portion of the feed itself, and in which part of this portion is removed from the column prior to full heating, and all of this heating stream is recycled with the main portion of the feed to the column, and the cooling requirements on the feed are supplied by the separated overhead product which is further cooled by an isentropic expansion and, after so cooling, is used to abstract heat in continuous heat exchange relationship from the vapors of the feed countercurrently down to the point adjacent the feed entry to the column.

Still another object of this invention is to provide process and apparatus for reversibly rectifying a gaseous mixture wherein a portion of the feed is utilized for the heating requirements within the rectification column, and this heating is effected to a controlled degree by compression of the main feed gas, and wherein the work for this compression is at least partly supplied by an isentropic expansion of the most volatile separated gas from the rectification column.

Yet another object of this invention is to provide process and apparatus for separating methane from natural gas by means of a reversible rectification system under pressure in which the feed gas is initially compressed and thereby somewhat heated by work performed in an isentropic expansion of the methane separated in the rectification process, and in which the heating requirements within the rectification column are supplied by a portion of the so compressed gas.

Other objects of this invention will appear in the detailed disclosure taken in conjunction with the drawing illustrating a typical embodiment of this invention. It is to be understood that this drawing illustrates a preferred embodiment of this invention, is for the purpose of description only, and is not intended to be limiting in scope.

The drawing is a schematic flow sheet showing the arrangement of the various heat exchangers, turboexpanders, the reversible rectification column, and the flow of materials therethrough, according to the teachings of this invention.

Reference will be had to the drawing for showing an example of the separation of methane from a natural gas mixture having the following analysis:

|  | Per cent |
|---|---|
| Methane | 93.79 |
| Ethane | 4.74 |
| Propane | 1.02 |
| Butane and heavier components | 0.45 |

This mixture at 450 p. s. i. a. has a dew-point of −60° F. with complete saturation at −131° F. In following the flow of materials through the process, there will be described the flow for 100 mols of the above composition.

Briefly, the feed is first of all compressed by a blower 50 and auxiliary turbine driver 51 connected to the turboexpander 52, after which it is divided up and passed to a plurality of heat exchangers and heating means in a column, then combined and introduced into the reversible rectifier for separation of methane from the heavier components.

The turboexpander used in this invention may be of the conventional radial flow type described by Swearingen in "Transactions of American Institute of Chemical Engineers," volume 43, page 85, 1947, such as that manufactured by the Elliott Company of Jeannette, Pennsylvania. Likewise, the heat exchangers indicated at 11, 13, 14, 17, 18, 19, 20, 21, 60 and 61 may be of any conventional type, such as the tube and sheet form of heat exchanger, radial fins, etc.

Similarly, the reversible rectification column may be a packed column. The invention is, however, of particular advantage in a column in which heat from the heating fluid can be transferred to the mass transfer surface area, or a column in which special heat exchangers having a large surface area are used as the mass transfer means. Such heat exchangers may be Thermek tubing heat exchangers made by Thermek Company of Chicago, Illinois, the perforated or serrated sandwich type of heat exchanger made by the Trane Company of La Crosse, Wisconsin, or the aluminum brazed multipass extruded biscuit type of exchanger made by Stacey-Dresser Company of Cincinnati, Ohio. Conventional tube heat exchangers may be equally well employed. In such heat exchangers, the surface area for heat transfer is at least equal to that required for the mass transfer of the liquid and vapor, so that equilibrium may be effected continuously throughout this column in the reversible rectification process.

It is a feature of this invention that the surface of the heat exchangers transferring heat or abstracting heat from the fluid being rectified in the column acts as a mass transfer means, per se. This represents a unity of operation that effects great economies in plant installation as well as operating expense.

Thus, the perforated sandwich type of heat exchanger, the Thermek tubing exchanger, and the biscuit exchanger have extensive surface areas which may be used in the rectification column both as the heat exchange means and the mass transfer means.

The column itself, which is generally indicated at 10, is provided with an upper heat exchanger 11 which extends from near the top of the column to adjacent the feed entry point indicated at 12. The bottom heat exchanger comprises two sections 13 and 14 separated by a valve 15 communicating with conduit 16 leading exteriorly of the column. Auxiliary valves 54 and 55, connected to conduit 16 by conduits 57 and 58 and to heat exchanger sections 60 and 61, are provided to vary the effective relative lengths of heat exchangers 13 and 14. When any one of these valves is opened to conduit 16 the others are closed. This provides for the dividing out of a portion of the heating fluid which is introduced at the bottom of section 13 and then run upwardly countercurrently to cold downcoming fluid in the column. The remainder of the heating fluid or stream after passing through valve 15 then passes into section 14 and is removed therefrom adjacent the feed inlet point 12.

All of the heat exchangers 11, 13 and 14 within the rectification column 10 are of conventional type and may be of any available form, the main object being, of course, the efficient transfer of heat therethrough between the fluid within these heat exchange sections and the fluid material exteriorly thereof in the column which is undergoing separation.

The feed gas mixture having the above-identified composition is introduced into the process through conduit 22. For the purpose of this description the pressure of this feed gas is given as 220 p. s. i. a. and 70° F., but this is for the purpose of description only, and it is to be understood that both the temperature and the pressure are subject to considerable variation. This pressure, however, is one that is of a convenient value from transmission lines and is, of course, not limiting. Conduit 22 leads into the blower portion of the turboexpander, is compressed to 450 p .s. i. a., leaves the blower at this pressure and at a somewhat elevated temperature through conduit 23 where it is cooled by water-cooled intercooler 59 to 100° F. This amount of cooling is variable depending upon process requirements. Stream 23 is then split up into two additional conduits 24 and 25. Conduit 24 leads to heat exchanger 17, and the conduit 25 is connected to the bottom of heat exchanger 13 within the rectification column 10.

The feed from conduit 23 which comprises the 100 mols, for the purpose of description of this invention, is split into two streams, 81.9 mols going through conduit 24, and 18.1 mols going through conduit 25. This division is subject to the process requirements, as will be later described, which will be dependent upon the make-up of the feed gas mixture. The 81.9 mols of feed gas passing through heat exchanger 17 are cooled to −55° F. and leave the exchanger through conduit 26 which communicates with proportioning valve 27. Connected to one of the outlets of this valve is a conduit 28 which is connected to the inlet side of heat exchanger 18. Through this conduit 28 is passed 39.39 mols of feed gas mixture at −55° F.

The proportioning valve 27 has another inlet connected to the conduit 16 which is in communication with valve 15 at its other end. This conduit receives 7.49 mols of feed gas which have been cooled to −55° F. in heat exchanger 13 within the rectification column, as will be more fully described below. This makes a total charge of 89.39 mols of feed gas at −55° F. to the proportioning valve. The proportioning valve further has another outlet connected to conduit 30 which communicates at its other end with heat exchanger 21 and through which 50 mols of the gas mixture are passed. In heat exchanger 21 this portion is cooled to −105° F. and is led from the exchanger 21 through conduit 31.

The 39.39 mols of gas leaving proportioning valve 27 and passing through heat exchanger 18 are cooled to −105° F. This is combined with stream 31 to make 89.39 mols in all cooled to −105° F. This combined stream is introduced into heat exchanger 19 by conduit 33 wherein it is cooled to −110° F. and leaves through conduit 34.

The 18.1 mol stream of feed gas which was sent through conduit 25 and heat exchanger 13 and from which 7.49 mols were removed through valve 15 and conduit 16 now totals 10.61 mols. This stream is sent through heat exchanger 14 wherein it is cooled to −102° F. This stream leaves the exchanger 14 by conduit 35 and is introduced into heat exchanger 20 wherein it is cooled to −110° F. This feed gas stream comprising 10.61 mols in exchanger 20 passes therefrom by conduit 36.

The two streams of feed gas in conduits 36 and 34 comprising 10.61 mols and 89.39 mols, respectively, are combined in conduit 37 and are introduced into the column 10 at entry point 12, making up 100 mols in all at −110° F. and 450 p. s. i. a., representing a partially saturated gas.

Returning to the first portion of the process wherein 18.1 mols of the feed gas mixture are separated from the stream 23 by conduit 25 and introduced into the bottom of heat exchanger 13, it will be seen that this entire stream is cooled to −55.5° F. which is approximately the dewpoint of −60° F. of the feed gas mixture. The 7.49 mols of this mixture are removed through valve 15 and conduit 16 to be recycled to the process since it is desired that a major portion of the gas supply in this heating stream be reduced to as low a temperature as possible. The available cooling within the column should not be entirely used in latent heat of condensation alone, which would have been substantially the case if this whole stream had been passed directly into heat exchanger 14 without any division. By separating out the 7.49 mols there is left 10.61 mols which are available to be cooled to the low temperature of −102° F. representing the most efficient utilization of the cooling effect within the column that is available.

The 10.61 mols passing through heat exchanger 14 pass out of the column 10 adjacent to the fluid entry point 12 which is at −110° F. This portion of the feed then passes, as previously mentioned, through conduit 35 where it is additionally cooled in heat exchanger 20 to −110° F., and then directly introduced with the remainder of the feed to the column.

In the rectifying column 95.91 mols of overhead product are separated at −111° F. through conduit 53. This overhead product which is substantially pure methane analyzes as follows:

| | Percent |
|---|---|
| Methane | 97.8 |
| Ethane | 2.14 |
| Propane | 0.08 |

This overhead product which will be termed "methane" is used for supplying the cooling in the entire process, including all of the heat exchangers 17, 18, 19, 20 and 21, and is introduced first into heat exchanger 20 for that purpose. The methane stream, which in the cooling process in heat exchanger 20 is heated to −109° F., is further utilized for cooling in heat exchanger 21 where it is in its cooling process heated up to −63° F.

This methane stream, which was passed from heat exchanger 20 to 21 by conduit 38, leaves heat exchanger 21 via conduit 39 at 450 p. s. i. a. which is the same pressure maintained within the column 10 and in all of the streams previously described. The methane is then further utilized in this process for cooling by subjecting it to an isentropic expansion within the turboexpander 52 wherein its pressure is reduced to 220 p. s. i. a. and a temperature of −122° F.

In the course of this, isentropic expansion work is performed and is utilized in the blower 50 which initially compresses the feed stream. Additional compression may be had where required by the auxiliary turbine driver 51 which can be conventionally driven by steam or gasoline. Should the feed be introduced to the blower at higher pressures this auxiliary turbine driver may be eliminated and, of course, only such work should be furnished by the auxiliary turbine driver as is not available in the turboexpander which depends upon the process requirements.

The methane which has been cooled to −122° F. and reduced to a pressure of 220 p. s. i. a. leaves the turboexpander by conduit 40 and is introduced at the top of heat exchanger 11 in the rectification column. Here the methane product is used to abstract heat continuously from adjacent the top of the column where the overhead products leave, down to the point of entry of the feed gas mixture at 12. In so doing this stream is heated a small degree to −120° F. It is particularly to be noted that in this reversible rectification process the refrigeration requirement above the feed entry in the column is very small, which represents a very advantageous feature in this process as compared to conventional adiabatic processes.

The methane stream leaving heat exchanger 11 by conduit 41 is then further utilized for cooling by introducing it to heat exchanger 19. In the course of this cooling operation the stream of methane is heated to −108° F. Subsequently, the stream is further utilized by leading it through conduit 42 to heat exchanger 18 for cooling purposes, in the course of which it is heated to −65° F.

In the last cooling operation the methane stream leaves heat exchanger 18 by conduit 43 and is introduced into heat exchanger 17 and is therein heated to 90° F. It is then recovered as an overhead product through conduit 44. This overhead product is at 220 p. s. i. a., the same pressure as the metal feed gas, and includes 95.91 mols of 97.78% methane, as above identified.

At the bottom of the rectification column 10 the liquid product is recovered through conduit 45 and includes 4.09 mols of product at 450 p. s. i. a. This product analyzes as follows:

| | Mols |
|---|---|
| Ethane | 2.70 |
| Propane | 0.94 |
| Butane and heavier products | 0.45 |

This process makes possible very economic recovery of gases by a reversible rectification process with a minimum of cooling required as distinct from the conventional adiabatic type of rectification. In the conventional adiabatic rectification, heat is added in either one or several separate places by reboilers or the like, and all the heat added must be matched by heat abstraction above the point of the entry of the feed to the unit. In this reversible rectification process here described, the heat supplied beneath the entry point is continuously added to the downcoming liquid up to the point of the feed entry, and the heat abstracted from the vapors thereabove is only a small fraction of the heat supplied to the column.

Thus, in the example, about 26,500 B. t. u. are supplied in heat exchanger 13 and about 8,500 B. t. u. in heat exchanger 14, making 35,000 B. t. u. in all. However, the heat abstracted above the feed entry point 12 in heat exchanger 11 is only 1,000 B. t. u., whereas in the adiabatic type of rectification 35,000 B. t. u. would have been required, which is an obvious advantage of this invention both in equipment required and the energy requirements.

This process has been particularly described for the reversible rectification of the gas having the above-identified composition, but the process is adaptable to handle richer gases, i. e., gaseous mixtures which have a higher percentage of ethane and heavier organic constituents. Thus, for such richer gases a higher percentage of the feed mixture is put through stream 24 than that described above. This will be somewhat more than the 81.9 mols in the example. For such richer gases where the methane content is reduced from that described in the example, the heating requirement beneath the entry point 12 of the feed gas mixture is less since there is less dissolved methane in the downcoming liquid. For this reason the portion of the feed cycled through conduit 25 can be reduced below the 18.1 mols of the example.

In every case, however, the portion of the feed that is cycled through conduit 25 into the heat exchangers 13 and 14 is partially divided at valve 15 when the feed has been cooled to approximately the dew-point of the mixture. At this point a portion of the feed cycled through heat exchanger 13 is divided out in order that the most efficient utilization of the cooling effect within the rectification column be utilized. Thus, this cooling effect is not lost entirely, as far as low temperature cooling of the feed is concerned, in latent heat of condensation in cooling the heating fluid. By acting only against a portion of this divided stream in heat exchanger 14, a much lower temperature reduction is made possible than if the entire portion of the feed cycled through the exchanger 13 were to be employed continuously into heat exchanger 14.

Where the feed gas mixture is leaner and the methane content is higher, the reverse of the practice mentioned in the preceding paragraph with respect to the division of the feed in conduits 24 and 25 employed. Thus, where the methane content is higher and the feed is thereby leaner, a greater portion than the 18.1 mols mentioned in the example is cycled through heat exchanger 13 and 14 via conduit 25 than mentioned in the example. This provides for a greater heating below the feed entry point in the column, and thereby ensures the boiling off of substantially all of the methane as a high purity overhead product. Likewise, where the feed is leaner, the feed mixture introduced to the column at entry point 12 is cooled to a lower degree than −110° F., whereas in a richer feed with less methane the feed gas mixture can be introduced to inlet point 12 at a somewhat higher temperature than −110° F.

In the case of the leaner gas with more methane, since there is a greater proportion of the feed cycled into conduit 25 through heat exchangers 13 and 14, and since there is a greater amount of overhead product from the top of the rectification column, more refrigerant is available for cooling the feed gas mixture within the process. Similarly, where the feed is richer, less refrigerating effect is available from conduit 25 supplying a portion of the feed to heat exchangers 13 and 14, and less overhead product in the form of methane is available from the top of the column. Further, not as much refrigeration is required due to the somewhat higher temperature of the feed introduced at inlet point 12.

This process is well adapted to be used on feed gases of varying composition, as described above, and additional heat can be supplied at the bottom of the rectification column by a conventional steam reboiler, if so desired, although the heating requirements are adapted to be furnished by the feed gas itself in compressing the feed gas mixture in the blower of the turboexpander. Also, additional refrigeration can be supplied from outside sources, if desired, at the top of the column 10 by conventional condensers, as will be well understood by those skilled in this art.

As another example of the adaptability of this process, the feed gas which is introduced to the blower by conduit 22 and leaves at conduit 23 at a pressure of 450 p. s. i. a. can be partially intercooled by a conventional intercooler by dividing the product into two streams with the cooled stream ultimately going to conduit 24 and the subsequent heat exchangers, whereas the uncooled portion which is heated up in the compression stage is utilized in conduit 25 for heating purposes within heat exchangers 13 and 14 at the bottom of the reversible rectification column. Various other modifications and alternative cycling procedures may be employed in this process, as will be readily apparent to those skilled in the art, and it is to be understood that such changes and modifications are within the teachings of this invention as heretofore described.

What is claimed is:

1. A process for separating a mixture of fluids having different boiling points, in a vertical column type system having a fluid inlet opening into the column above the bottom thereof and a stripping section extending downwardly from adjacent the inlet to the lower part of the column, comprising the steps of: delivering into the column, by means of the inlet, the fluid to be separated into a lower boiling point gaseous component and a higher boiling point liquid component; introducing into the bottom portion of the stripping section a fluid heat exchange medium in indirect heat exchange relation with and at a slight temperature above the temperature of the material in the bottom of the column, said heat exchange medium having an available heat content driving force sufficient to deliver heat to the column and vaporize substantially all of the lower boiling point component, providing thereby a rising vapor stream of the lower boiling component and descending liquid stream of the higher boiling point component; causing the heat exchange medium to rise within the column and cooling the heat exchange medium by heat exchange with the vapor and liquid components within the column, reducing the available heat content of the heat exchange medium by withdrawing in at least one stage a portion of the heat exchange medium, causing the remainder of the heat exchange medium to rise in the column to impart heat to the materials in the column and cause said heat exchange medium to be cooled thereby, in a varying temperature gradient heightwise above said withdrawal point up to adjacent the inlet and maintaining the vapor and liquid components in substantial temperature equilibrium with another at any section in the column where said heat exchange medium is present, and withdrawing said heat exchange medium adjacent the inlet.

2. A process for separating a mixture of fluids having different boiling points, in a vertical column type system having a fluid inlet opening into the column above the bottom thereof and a stripping section extending downwardly from adjacent the inlet to the lower part of the column, comprising the steps of: delivering into the column, by means of the inlet, the fluid to be separated into a lower boiling point gaseous component and a higher boiling point liquid component; introducing into the bottom portion of the stripping section a fluid heat exchange medium in indirect heat exchange relation with and at a slight temperature above the temperature of the material in the bottom of the column, said heat exchange medium having an available heat content driving force sufficient to deliver heat to the column and vaporize substantially all of the lower boiling point component, providing thereby a rising vapor stream of the lower boiling component and descending liquid stream of the higher boiling point component; causing the heat exchange medium to rise within the column and cooling the heat exchange medium by heat exchange with the vapor and liquid components within the column, reducing the available heat content of the heat exchange medium by withdrawing in at least one stage a portion of the heat exchange medium, causing the remainder of the heat exchange medium to rise in the column to impart heat to the materials in the column and cause said heat exchange medium to be cooled thereby, in a varying temperature gradient heightwise above said withdrawal point up to adjacent the inlet and maintaining the vapor and liquid components in substantial temperature equilibrium with one another at any section in the column where said heat exchange medium is present, and withdrawing said heat exchange medium adjacent the inlet, said step of withdrawing heat exchange medium including reducing the available heat content of the heat exchange medium to reduce and regulate the temperature difference between the heat exchange medium and the materials in the column.

3. A process for separating a mixture of fluids having different boiling points, in a vertical column type system having a fluid inlet opening into the column above the bottom thereof and a stripping section extending downwardly from adjacent the inlet to the lower part of the column, comprising the steps of: delivering into the column, by means of the inlet, the fluid to be separated into a lower boiling point gaseous component and a higher boiling point liquid component; introducing into the bottom portion of the stripping section a fluid heat exchange medium in indirect heat exchange relation with and at a slight temperature above the temperature of the material in the bottom of the column, said heat exchange medium having an available heat content driving force sufficient to deliver heat to the column and vaporize substantially all of the lower boiling point component, providing thereby a rising vapor stream of the lower boiling component and descending liquid stream of the higher boiling point component; causing the heat exchange medium to rise within the column and cooling the heat exchange medium by heat exchange with the vapor and liquid components within the column, reducing the available heat content of the heat exchange medium by withdrawing in at least one stage a portion of the heat exchange medium, causing the remainder of the heat exchange medium to rise in the column to impart heat to the materials in the column and cause said heat exchange medium to be cooled thereby, in a varying temperature gradient heightwise above said withdrawal point up to adjacent the inlet and maintaining the vapor and liquid components in substantial temperature equilibrium with one another at any section in the column where said heat exchange medium is present, and withdrawing said heat exchange medium adjacent the inlet, said heat exchange medium being added to the column in the form of a gas and the portion which is withdrawn being approximately at a temperature at which condensation has started to occur, and at a position within the column where the cooling by the material in the column has just begun to cause condensation within the heat exchange medium.

4. A process for separating a mixture of fluids having different boiling points in a vertical column type system having a fluid inlet opening into the column above the bottom thereof and a stripping section extending downwardly from adjacent the inlet to the lower part of the column, comprising the steps of: delivering into the column, by means of the inlet, the fluid to be separated into a lower boiling point gaseous component and a higher boiling point liquid component; introducing into the bottom portion of the stripping section a fluid heat exchange medium in indirect heat exchange relation with and at a slight temperature above the temperature of the material in the bottom of the column, said heat exchange medium having an available heat content driving force sufficient to deliver heat to the column and vaporize substantially all of the lower boiling point component, providing thereby a rising vapor stream of the lower boiling component and descending liquid stream of the higher boiling point component; causing the heat exchange medium to rise within the column and cooling the heat exchange medium by heat exchange with the vapor and liquid components within the column, reducing the available heat content of the heat exchange medium by withdrawing in at least one stage a portion of the heat exchange medium, causing the remainder of the heat exchange medium to rise in the column to impart heat to the materials in the column and cause said heat exchange medium to be cooled thereby, in a varying temperature gradient heightwise above said withdrawal point up to adjacent the inlet and maintaining the vapor and liquid components in substantial temperature equilibrium with one another at any section in the column where said heat exchange medium is present, and withdrawing said heat exchange medium adjacent the inlet, said heat exchange medium being added to the column in the form of a gas and the portion which is withdrawn being approximately at a temperature at which condensation has started to occur, and at a position within the column where the cooling by the material in the column has just begun to cause condensation within the heat exchange medium, said heat exchange medium being withdrawn from adjacent the inlet at approximately the temperature of the cooled feed fluid and comprising at least part of the feed fluid prior to its cooling for the column, so that its dew point is related in known manner to the dew point at the inlet and wherein the heat exchange medium after being withdrawn from the column is introduced into the inlet of the column for rectification.

5. A process for separating a mixture of fluids having different boiling ponts, in a vertical column type system having a fluid inlet opening into the column above the bottom thereof and a stripping section extending downwardly from adjacent the inlet to the lower part of the column, comprising the steps of: delivering into the column, by means of the inlet, the fluid to be separated into a lower boiling point gaseous component and a higher boiling point liquid component; introducing into the bottom portion of the stripping section a fluid heat exchange medium in indirect heat exchange relation with and at a slight temperature above the temperature of the material in the bottom of the column, said heat exchange medium having an available heat content driving force sufficient to deliver heat to the column and vaporize substantially all of the lower boiling point component, providing thereby a rising vapor stream of the lower boiling component and descending liquid stream of the higher boiling point component; causing the heat exchange medium to rise within the column and cooling the heat exchange medium by heat exchange with the vapor and liquid components within the column, reducing the available heat content of the heat exchange medium by withdrawing in at least one stage a portion of the heat exchange medium, causing the remainder of the heat exchange medium to rise in the column to impart heat to the materials in the column and cause said heat exchange medium to be cooled thereby, in a varying temperature gradient heightwise above said withdrawal point up to adjacent the inlet and maintaining the vapor and liquid components in substantial temperature equilibrium with one another at any section in the column where said heat exchange medium is present, and withdrawing said heat exchange medium adjacent the inlet, said feed fluid being cooled to at least its dew point but above complete condensation whereby the heat exchange medium is likewise maintained above complete condensation within the column in order that it can provide a varying temperature gradient at different height levels and be cooled itself to decreasing temperatures within the column at different height levels therein.

6. A process for separating a mixture of fluids having different boiling points, in a vertical column type system having a rectification section with a fluid inlet opening into the column beneath the bottom thereof and a stripping section extending downwardly from adjacent the inlet to the lower part of the column, comprising the steps of: delivering into the column, by means of the inlet, the fluid to be separated into a lower boiling point gaseous component and a higher boiling point liquid component; introducing into the bottom portion of the stripping section a fluid heat exchange medium in indirect heat exchange with and at a temperature slightly above the material in the bottom of the column, said heat exchange medium having an available heat content driving force sufficient to deliver heat to the column and vaporize substantially all of the lower boiling point component providing thereby a rising vapor stream of the lower boiling component and a descending liquid stream of the higher boiling point component; causing the heat exchange medium to rise within the column, and cooling the heat exchange medium by heat exchange with the vapor and liquid components within the column and withdrawing in at least one stage a portion of the heat exchange medium; causing the remainder of the heat exchange medium to rise in the column to impart heat to the materials in the column and cause said heat exchange medium to be cooled thereby, in a varying temperature gradient heightwise above said withdrawal point up to adjacent the inlet under conditions such that at any section in the column where said heat exchange medium is present vapor and liquid components are in substantial temperature equilibrium with one another, and withdrawing said heat exchange medium adjacent the inlet at approximately the temperature of the incoming mixture of fluids; introducing to the column a second heat exchange medium having an available refrigeration content driving force sufficient to abstract heat from the column and condense substantially all of the higher boiling point component, said second heat exchange medium being introduced into the top portion of the rectification section at a temperature slightly below the lower boiling point component therein, providing thereby a descending reflux liquid which becomes progressively richer in the higher boiling point component as it descends the column and a rising vapor stream which becomes progressively richer in the lower boiling point component as it ascends the column; causing the second heat exchange medium to descend within the column and abstracting heat therefrom by heat exchange with the vapor and liquid components under conditions such that at any section in the column where said heat exchange medium is present, said second heat exchange medium vapor and liquid components are in substantial temperature equilibrium with one another, and withdrawing said heat exchange medium adjacent the inlet at approximately the temperature of the incoming mixture of fluids.

7. A process for separating a mixture of fluids having different boiling points, in a vertical column type system having a rectification section with a fluid inlet opening into the column beneath the bottom thereof and a stripping section extending downwardly from adjacent the inlet to the lower part of the column, comprising the steps of: delivering into the column, by means of the inlet, the fluid to be separated into a lower boiling point gaseous component and a higher boiling point liquid component; introducing into the bottom portion of the stripping section a fluid heat exchange medium in indirect heat exchange with and at a temperature slightly above the material in the bottom of the column, said heat exchange medium having an available heat content driving force sufficient to deliver heat to the column and vaporize substantially all of the lower boiling point component providing thereby a rising vapor stream of the lower boiling component and a descending liquid stream of the higher boiling point component; causing the heat exchange medium to rise within the column, and cooling the heat exchange medium by heat exchange with the vapor and liquid components within the column and withdrawing in at least one stage a portion of the heat exchange medium; causing the remainder of the heat exchange medium to rise in the column to impart heat to the materials in the column and cause said heat exchange medium to be cooled thereby, in a varying temperature gradient heightwise above said withdrawal point up to adjacent the inlet under conditions such that at any section in the column where said heat exchange medium is present, vapor and liquid components are in substantial temperature equilibrium with one another, and withdrawing said heat exchange medium adjacent the inlet at approximately the temperature of the incoming mixture of fluids; introducing to the column a second heat exchange medium having an available refrigeration content driving force sufficient to abstract heat from the column and condense substantially all of the higher boiling point component, said second heat exchange medium being introduced into the top portion of the rectification section at a temperature slightly below the lower boiling point component therein, providing thereby a descending reflux liquid which becomes progressively richer in the higher boiling point component as it descends the column and a rising vapor stream which becomes progressively richer in the lower boiling point component as it ascends the column; causing the second heat exchange medium to descend within the column and abstracting heat therefrom by heat exchange with the vapor and liquid components under conditions such that at any section in the column where said heat exchange medium is present, said second heat exchange medium vapor and liquid components are in substantial temperature equilibrium with one another, and withdrawing said heat exchange medium adjacent the inlet at approximately the temperature of the incoming mixture of fluids, said lower boiling point gaseous component being separated from the column and reduced in temperature by an isentropic expansion and subsequently used as said second heat exchange medium, and the work performed by the isentropic expansion being utilized in compressing one of the fluids in the process.

8. A process for reducing the cooling and refrigeration requirements in the separation under elevated pressure and reduced temperature of a mixture of fluids having different boiling points, in a vertical column type system having a rectification section with a fluid inlet opening into the column beneath the bottom thereof and a stripping section extending downwardly from adjacent the inlet to the lower part of the column, which comprises the steps of: taking the feed fluid mixture at an elevated pressure and ambient temperature and cooling the same to a reduced temperature and delivering into the column by means of the inlet, the fluid to be separated into a lower boiling point gaseous component and a higher boiling point liquid component; introducing into the bottom portion of the stripping section a fluid heat exchange medium in indirect heat exchange relation with and at a temperature slightly above the material in the bottom of the column, said heat exchange medium consisting at least in part of said feed fluid prior to its deliverance to the column, said medium having an available heat content driving force sufficient to deliver heat to the column and vaporize substantially all of the lower boiling point component providing thereby a rising vapor stream of the lower boiling component and a descending liquid stream of the higher boiling point component; causing the heat exchange medium to rise within the column and cooling the heat exchange medium by heat exchange with the vapor and liquid components within the column and withdrawing in at least one stage a portion of the heat exchange medium; causing the remainder of the heat exchange medium to rise in the column to impart heat to the materials in the column and cause said heat exchange medium to be cooled thereby, in a varying temperature gradient heightwise above said withdrawal point up to adjacent the inlet under conditions such that at any section in the column where said heat exchange medium is present, said heat exchange medium, vapor and liquid components are in substantial temperature equilibrium with one another, and withdrawing said heat exchange medium adjacent the inlet at approximately the temperature of the incoming mixture of fluids.

9. A process for reducing the cooling and refrigeration requirements in the separation under elevated pressure and reduced temperature of a mixture of fluids having different boiling points, in a vertical column type system having a rectification section with a fluid inlet opening into the column beneath the bottom thereof and a stripping section extending downwardly from adjacent the inlet to the lower part of the column, which comprises the steps of: taking the feed fluid mixture at an elevated pressure and ambient temperature and cooling the same to a reduced temperature and delivering into the column by means of the inlet, the fluid to be separated into a lower boiling point gaseous component and a higher boiling point liquid component; introducing into the bottom portion of the stripping section a fluid heat exchange medium in indirect heat exchange relation with and at a temperature slightly above the material in the bottom of the column, said heat exchange medium consisting at least in part of said feed fluid prior to its deliverance to the column, said medium having an available heat content driving force sufficient to deliver heat to the column and vaporize substantially all of the lower boiling point component providing thereby a rising vapor stream of the higher boiling component and a descending liquid stream of the higher boiling point component; causing the heat exchange medium to rise within the column and cooling the heat exchange medium by heat exchange with the vapor and liquid components within the column and withdrawing in at least one stage a portion of the heat exchange medium; causing the remainder of the heat exchange medium to rise in the column to impart heat to the materials in the column and cause said heat exchange medium to be cooled thereby in a varying temperature gradient heightwise above said withdrawal point up to adjacent the inlet under conditions such that at any section in the column where said heat exchange medium is present, said medium, vapor and liquid components are all in substantial temperature equilibrium with one another, and withdrawing said heat exchange medium adjacent the inlet at approximately the temperature of the incoming mixture of fluids; introducing to the column a second heat exchange medium having an available refrigeration content driving force sufficient to abstract heat from the column and condense substantially all of the higher boiling point component, said second heat exchange medium being introduced into the top portion of the rectification section at a temperature slightly below the lower boiling point component therein, providing, thereby a descending reflux liquid which becomes progressively richer in the higher boiling point component as it descends the column and a rising vapor stream which becomes progressively richer in the lower boiling point component as its ascends the column; causing the second heat exchange medium to descend within the column and abstracting heat therefrom by heat exchange with the vapor and liquid components under conditions such that at any section in the column where said heat exchange medium is present said second heat exchange medium, vapor and liquid components are all in substantial temperature equilibrium with one another, and withdrawing said heat exchange medium adjacent the inlet at approximately the temperature of the incoming mixture of fluids.

10. A process for reducing the cooling and refrigeration requirements in the separation under elevated pressure and reduced temperature of a mixture of fluids having different boiling points, in a vertical column type system having a rectification section with a fluid inlet opening into the column beneath the bottom thereof and a stripping section extending downwardly from adjacent the inlet to the lower part of the column, which comprises the steps of: taking the feed fluid mixture at an elevated pressure and ambient temperature and cooling the same to a reduced temperature and delivering into the column by means of the inlet, the fluid to be separated into a lower boiling point gaseous component and a higher boiling point liquid component; introducing into the bottom portion of the stripping section a fluid heat exchange medium in indirect heat exchange relation with and at a temperature slightly above the material in the bottom of the column, said heat exchange medium consisting at least in part of said feed fluid prior to its deliverance to the column, said medium having an available heat content driving force sufficient to deliver heat to the column and vaporize substantially all of the lower boiling point component, providing thereby a raising vapor stream of the higher boiling component and a descending liquid stream of the higher boiling point component; causing the heat exchange medium to rise within the column, and cooling the heat exchange medium by heat exchange with the vapor and liquid components within the column, and withdrawing in at least one stage a portion of the heat exchange medium; causing the remainder of the heat exchange medium to rise in the column to impart heat to the materials in the column and cause said heat exchange medium to be cooled thereby in a varying temperature gradient heightwise above said withdrawal point up to adjacent the inlet under conditions such that at any section in the column where said heat exchange medium is present, said medium, vapor and liquid component are all in substantial temperature equilibrium with one another, and withdrawing said heat exchange medium adjacent the inlet at approximately the temperature of the incoming mixture of fluids; introducing to the column a second heat exchange medium having an available refrigeration content driving force sufficient to abstract heat from the column and condense substantially all of the higher boiling point component, said second heat exchange medium being introduced into the top portion of the rectification section at a temperature slightly below the lower boiling point component therein, providing thereby a descending reflux liquid which becomes progressively richer in the higher boiling point component as it descends the column and a rising vapor stream which becomes progressively richer in the lower boiling point component as it ascends the column; causing the second heat exchange medium to descend within the column and abstracting heat therefrom by heat exchange with the vapor and liquid components under conditions such that at any section in the column where said heat exchange medium is present, said second heat exchange medium, vapor and liquid components are all in substantial temperature equilibrium with one another, and withdrawing said heat exchange medium adjacent the inlet at approximately the temperature of the incoming mixture of fluids, said feed fluid being cooled to at least its dew point but above complete saturation and the first named heat exchange medium being added to the column in the form of a gas which is comprised of, at least in part, the feed fluid prior to said cooling so that its dew point is related in known manner to the dew point at the inlet and the portion which is withdrawn is at a temperature at which condensation has just started to occur, and at a position within the column where the cooling by the material in the column has just begun to cause condensation within the heat exchange medium and wherein the heat exchange medium after being withdrawn from the column is introduced in unconfined manner into the inlet of the column for rectification.

References Cited in the file of this patent

UNITED STATES PATENTS

| | | |
|---|---|---|
| Re. 12,092 | Hiller | Mar. 3, 1903 |
| 87,144 | Collins | Feb. 23, 1869 |
| 2,122,238 | Pollitzer | June 28, 1938 |
| 2,134,700 | Brewster | Nov. 1, 1938 |
| 2,270,852 | Schuftan | Jan. 27, 1942 |
| 2,287,137 | Ross | June 23, 1942 |
| 2,503,265 | Haynes | Apr. 11, 1950 |
| 2,658,360 | Miller | Nov. 10, 1953 |
| 2,666,019 | Winn | Jan. 12, 1954 |
| 2,677,945 | Miller | May 11, 1954 |

FOREIGN PATENTS

| | | |
|---|---|---|
| 100,564 | Germany | Jan. 11, 1899 |